(12) United States Patent
Yan et al.

(10) Patent No.: US 11,349,226 B2
(45) Date of Patent: May 31, 2022

(54) FLEXIBLE FLAT CABLE ASSEMBLY AND BATTERY PACK CONNECTING ASSEMBLY

(71) Applicants: Tyco Electronics Technology (SIP) Co. Ltd., Suzhou (CN); Tyco Electronics (Shanghai) Co., Ltd., Shanghai (CN)

(72) Inventors: Chao Yan, Suzhou Jiangsu (CN); Xiaodong Peng, Suzhou Jiangsu (CN); Ziwei Li, Shanghai (CN)

(73) Assignees: Tyco Electronics Technology (SIP) Co. Ltd., Suzhou (CN); Tyco Electronics (Shanghai) Co. Ltd., Shanghai (CN)

( * ) Notice: Subject to any disclaimer, the term of this patent is extended or adjusted under 35 U.S.C. 154(b) by 242 days.

(21) Appl. No.: 16/841,730

(22) Filed: Apr. 7, 2020

(65) Prior Publication Data

US 2020/0328535 A1 Oct. 15, 2020

(30) Foreign Application Priority Data

Apr. 9, 2019 (CN) .......................... 201920473374.3

(51) Int. Cl.
| | |
|---|---|
| *H01R 4/18* | (2006.01) |
| *H01B 7/08* | (2006.01) |
| *H01R 43/048* | (2006.01) |
| *H01M 50/529* | (2021.01) |

(52) U.S. Cl.
CPC ............... *H01R 4/185* (2013.01); *H01B 7/08* (2013.01); *H01M 50/529* (2021.01); *H01R 43/048* (2013.01)

(58) Field of Classification Search
CPC ...... H01R 4/185; H01R 4/182; H01R 43/048; H01B 7/08; H01M 50/519; H01M 50/529; H01M 50/249; H01M 50/284; H01M 50/298; H01M 50/503
See application file for complete search history.

(56) References Cited

U.S. PATENT DOCUMENTS

| | | | |
|---|---|---|---|
| 6,375,492 B1 * | 4/2002 | Hio ........................ | H01R 12/68 439/422 |
| 7,509,732 B2 * | 3/2009 | Kumakura ........... | H01R 43/048 29/753 |
| 9,431,720 B2 * | 8/2016 | Ito ........................ | H01R 43/048 |

(Continued)

*Primary Examiner* — Abdullah A Riyami
*Assistant Examiner* — Nader J Alhawamdeh

(57) ABSTRACT

The application relates to a flexible flat cable assembly and a battery pack connecting assembly. The flexible flat cable assembly has a flexible flat cable and an adaptor terminal, wherein the flexible flat cable has an insulation sheath, a conductor body wrapped by the insulation sheath, and a connecting end which is provided to be integrated with the conductor body and comprises a connecting portion and a crimping portion extending continuously from the conductor body; the adaptor terminal has a terminal body and a pair of first crimping wings which are disposed on the terminal body and protrude from the terminal body; the crimping portion is in contact with the terminal body, and the first crimping wings surround the crimping portion to form a crimping region in which the crimping portion has a multilayer structure. The present application can ensure a secure connection during use, and is safe and convenient to use.

18 Claims, 4 Drawing Sheets

(56) References Cited

U.S. PATENT DOCUMENTS

| | | | | |
|---|---|---|---|---|
| 10,243,311 | B2 * | 3/2019 | Zhu | ............... H01R 13/631 |
| 2006/0264092 | A1 * | 11/2006 | Kumakura | ............ H05K 1/0218 |
| | | | | 439/422 |
| 2007/0077807 | A1 * | 4/2007 | Kumakura | ............ H01R 43/048 |
| | | | | 439/422 |
| 2016/0380252 | A1 * | 12/2016 | Rhein | ............... H01M 50/147 |
| | | | | 429/90 |
| 2018/0040996 | A1 * | 2/2018 | Zhu | ................ H01R 27/02 |

* cited by examiner

FLEXIBLE FLAT CABLE ASSEMBLY AND BATTERY PACK CONNECTING ASSEMBLY

TECHNICAL FILED

The present application relates to a flexible flat cable assembly and a battery pack connecting assembly.

BACKGROUND

The rapid development of new energy vehicles continuously promotes improvements in batteries. As demands on new energy vehicles have being grown higher, battery technology has become an important factor affecting the development of new energy vehicles. For example, the cost, weight and structure of batteries all influence the further development of new energy vehicles. Each vehicle battery is provided with a plurality of battery packs. These battery packs need to be interconnected. Using a rigid printed circuit board to connect two battery packs costs much, and also cannot reduce the thickness of the battery pack. If a flexible circuit board is used, the cost of the battery is further increased.

SUMMARY OF INVENTION

One of the objectives of the present application is to provide a flexible flat cable assembly and a battery pack connecting assembly which allow convenient connection of various battery packs to overcome the defects in the prior art.

According to a first aspect of the present application, there is provided a flexible flat cable assembly which comprises:

a flexible flat cable comprising an insulation sheath, a conductor body wrapped by the insulation sheath, and a connecting end, wherein the connecting end is provided to be integrated with the conductor body and comprises a connecting portion and a crimping portion extending continuously from the conductor body; and an adaptor terminal comprising a terminal body and a pair of first crimping wings which are disposed on the terminal body and protrude from the terminal body;

wherein the crimping portion is in contact with the terminal body, and the first crimping wings surround or abut against the crimping portion to form a crimping region in which the crimping portion has a multilayer structure.

According to an embodiment of the application, the crimping portion is plate-shaped and is configured to be folded in half in a length direction of the conductor body.

According to an embodiment of the application, the crimping portion is formed by pressing a structure with a U-shaped or V-shaped cross section.

According to an embodiment of the application, the crimping portion is provided with a first opening, the terminal body is enclosed to be groove-shaped, the groove-shaped terminal body is provided with a second opening, and the first opening and the second opening are non-coincidently oriented.

According to an embodiment of the application, the first opening and the second opening are oriented to be perpendicular to each other.

According to an embodiment of the application, the adaptor terminal is further provided with a pair of second crimping wings, and the pair of second crimping wings are disposed on the terminal body and protrude from the terminal body, and surround the insulation sheath to connect the terminal body to the connecting portion.

According to an embodiment of the application, the terminal body is enclosed to form an accommodating groove, and the pair of first crimping wings and a pair of second crimping wings are separately disposed on the terminal body; the connecting portion and the crimping portion are positioned in the accommodating groove, and via crimping, the first crimping wings are enabled to surround the crimping portion and the second crimping wings are enabled to surround the insulation sheath by crimping; and the first crimping wings and the second crimping wings connect the adaptor terminal to the connecting end and the insulation sheath.

According to an embodiment of the application, a plurality of the flexible flat cables are arranged to be connected side-by-side; the connecting end of each of the flexible flat cables is connected with one of the adaptor terminal; the accommodating groove of each of the adaptor terminal is provided with an opening; and an arrangement direction of the plurality of flexible flat cables is disposed to be non-coincident with an opening direction of the accommodating groove.

According to an embodiment of the application, the arrangement direction of the plurality of flexible flat cables is disposed to be perpendicular to the opening direction of the accommodating groove.

According to an embodiment of the application, the adaptor terminal is a male terminal or a female terminal.

According to an embodiment of the application, a plurality of the flexible flat cables are disposed to be connected side-by-side; and the connecting end of each of the flexible flat cables is connected with one of the adaptor terminals.

According to an embodiment of the application, a gap between the crimping portions of the plurality of connecting ends is larger than a gap between the plurality of conductor bodies.

According to an embodiment of the application, the crimping portion has a thickness larger than that of the conductor body.

According to an embodiment of the application, the individual layers of the crimping portion are disposed to be in contact with each other.

According to an embodiment of the application, the crimping portion has a multilayer structure in a crimping direction.

According to a second aspect of the present application, there is provided a battery pack connecting assembly comprising a support, a plurality of busbars and a plurality of the aforementioned flexible flat cable assemblies; wherein the plurality of busbars are configured for connecting battery cells; and the plurality of flexible flat cables are electrically connected to the plurality of busbars.

According to an embodiment of the application, a plurality of the flexible flat cables are provided; and the conductor bodies of the plurality of flexible flat cables are electrically connected to the plurality of busbars, respectively.

According to an embodiment of the application, the battery pack connecting assembly further comprises a connector casing, wherein the connector casing is fixedly disposed on the support; and the adaptor terminal is inserted into the connector casing for outputting electric signals.

To increase the utilization efficiency, the conductor in the flexible flat cable should be thin and narrow as much as possible. However, when the connecting end and the conductor are configured to be integratedly formed, the thin and narrow connecting end cannot provide sufficient retention necessary for connection strength, and can be broken by crimping operation in the crimping process, or can fall off due to failure in providing stronger retention during use.

According to the flexible flat cable assembly and the battery pack connecting assembly of the present application, the crimping portion is configured to be folded in half to enable the crimping portion in crimping connection with the adaptor terminal to have an increased thickness, so that damages occurring in the crimping process can be avoided and also sufficient retention can be provided after crimping to ensure a secure connection during use, and safe and convenient operation. The flexible flat cable assembly of the application can be used instead of rigid circuit boards and flexible circuit boards, so that both the thickness of the battery pack and the production cost can be reduced, and the development of batteries can be further promoted to meet the use requirements of new energy vehicles.

DETAILED DESCRIPTION OF EMBODIMENTS

Figure 1:
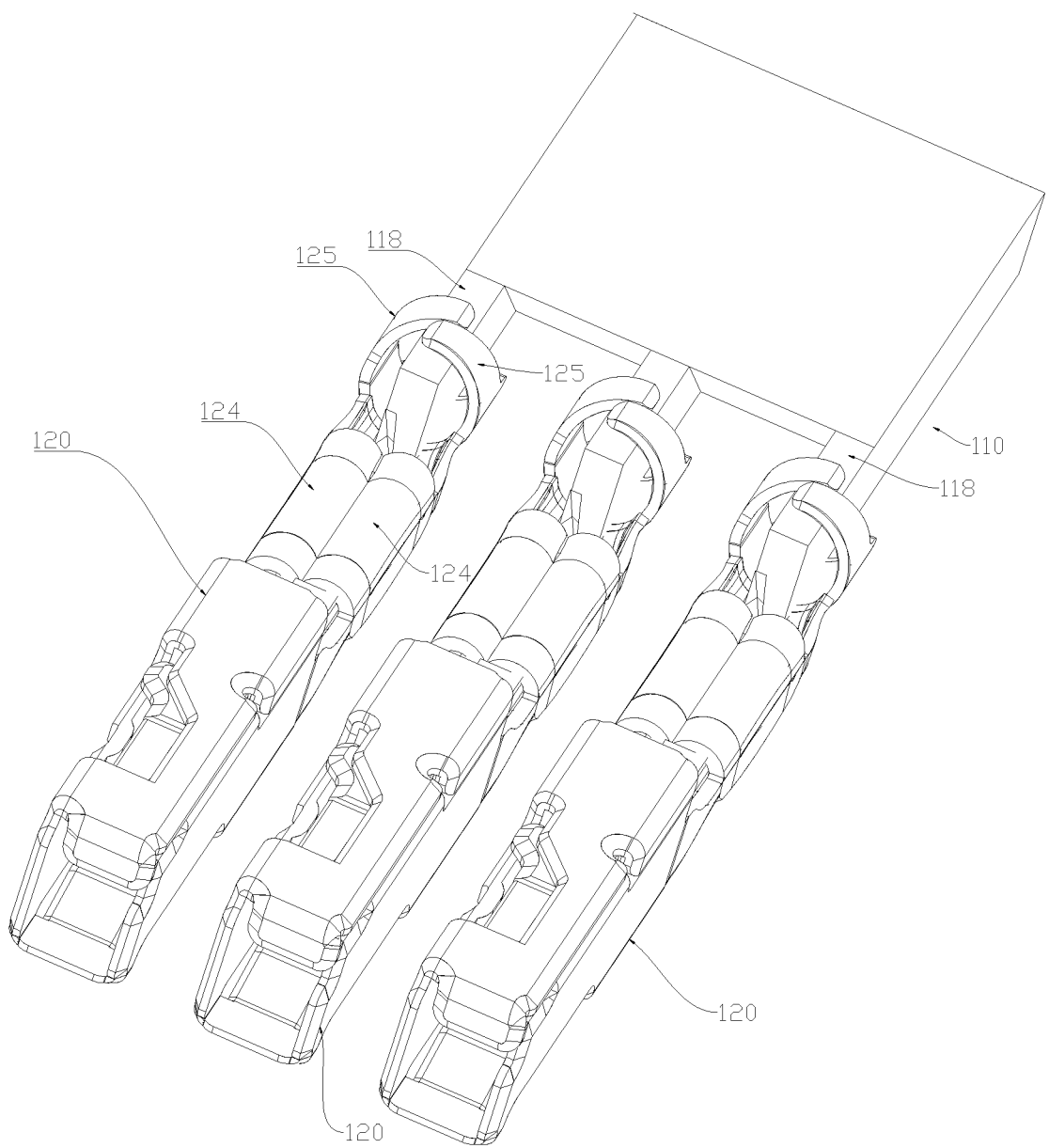
FIG. 1 is a structural schematic view of a flexible flat cable assembly according to the present application.
Figure 2:
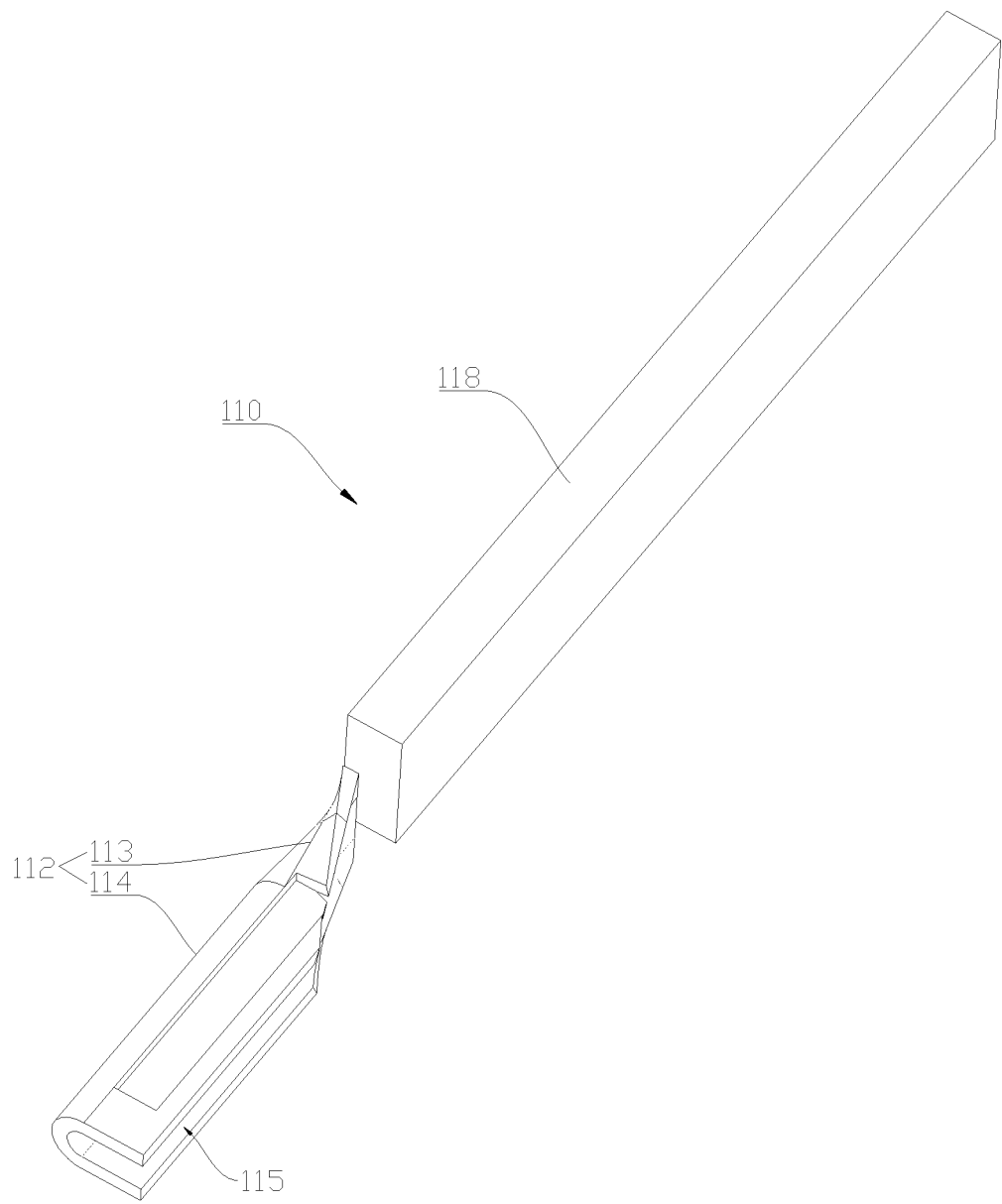
FIG. 2 is a structural schematic view of a flexible flat cable according to the present application.
Figure 3:
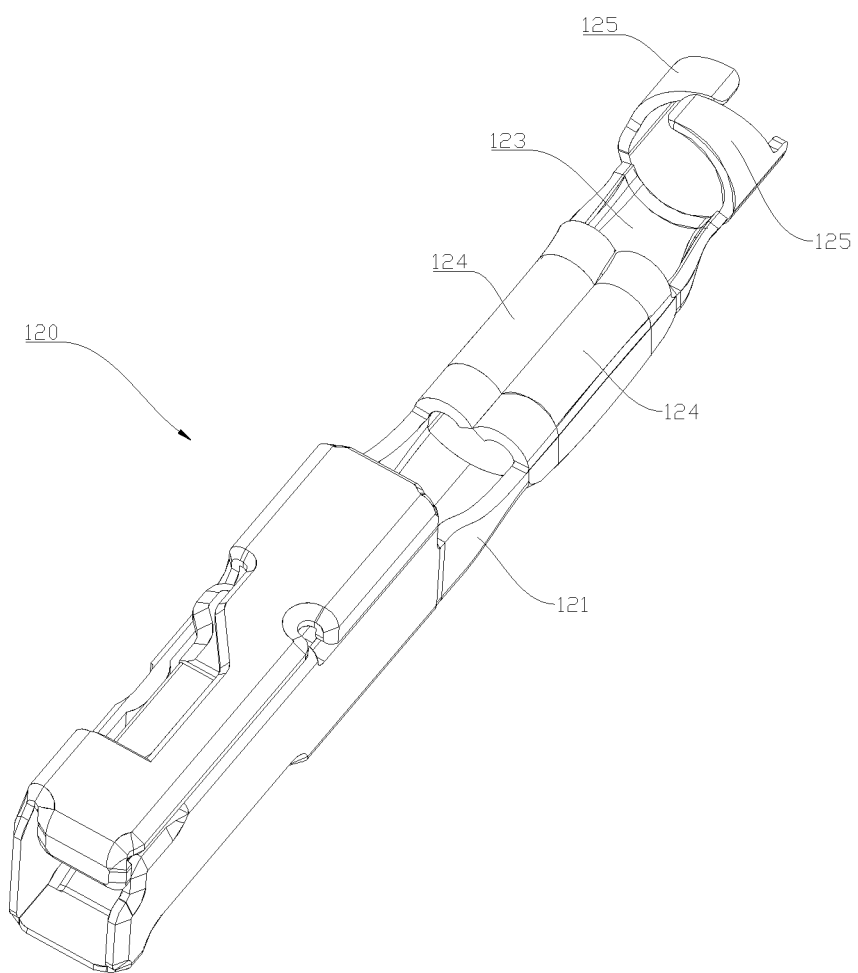
FIG. 3 is a structural schematic view of an adaptor terminal according to the present application.

As shown in FIGS. 1, 2 and 3, a flexible flat cable assembly 100 comprises a flexible flat cable 110 and an adaptor terminal 120. The flexible flat cable 110 comprises an insulation sheath 118, a conductor body 111 and a connecting end 112. The insulation sheath 118 is wrapped around the conductor body 111, and part of the conductor body 111 is exposed outside of the insulation sheath 118. The conductor body can be chosen according to the requirements of actual use, e.g. a suitable curved conductor, such as aluminum or copper, etc. The conductor body 111 is overall flexible and suitable to be curved to adapt to a space of an application situation. The connecting end 112 comprises a connecting portion 113 and a crimping portion 114. The connecting portion 113 is integrated with the crimping portion 114. The conductor body 111, the connecting portion 113 and the crimping portion 114 are sequentially connected. According to a technical solution of the present application, the connecting end 112 is configured to be integrated with the conductor body 111. The connecting end 112 is formed by bending and stamping a strip-shaped or plate-shaped conductor. The connecting end 112 and the conductor body 111 together form a conductor. Before crimping, an end of the conductor and the conductor body 111 are both plate-shaped or strip-shaped, and a length from the end of the conductor is selected to be processed by a bending process. After the end of the conductor is bent, the crimping portion 114 has a U-shaped or V-shaped cross section and is provided with a first opening 115. The crimping portion 114 is pressed and then deformed into a two-layer structure, i.e. a two-layer structure formed by folding a plate in half. After stamping, the upper and lower layers of the two-layer crimping portion 114 are in contact with each other. Because the crimping portion 114 is a two-layer structure which is formed by bending and stamping the same structure as the conductor body 111, the crimping portion 114 has a thickness larger than that of the conductor body 111.

The connecting portion 113 has no specific limitations on its structure and shape, and can be plate-shaped or can be configured to adapt to the shape of the crimping portion 114. For example, when the crimping portion 114 has a U-shaped or V-shaped cross section, an edge(s) of the connecting portion 113 gradually shrinks towards the middle to smoothly transition into the plate shape of the conductor body 111. The connecting portion 113 can also be directly configured to be plate-shaped. The connecting portion 113 is electrically connected to the conductor inside the terminal body 111.

The adaptor terminal 120 comprises a terminal body 121, a pair of first crimping wings 124 and a pair of second crimping wings 125. The adaptor terminal 120 is formed by stamping and bending a metal piece. An overall structure of the terminal body 121 can be determined according to the requirements of use, and can be either a male terminal or a female terminal. In the illustrated example, the adaptor terminal 120 is a female terminal. The terminal body 121 is provided with an accommodating groove 123 enclosed by a segment of the terminal body. The accommodating groove 123 is provided with a second opening 127. The accommodating groove 123 is configured for accommodating the crimping portion 114 and part of the insulation sheath 118. The pair of first crimping wings 124 is disposed on the terminal body 121. The first crimping wings 124 are connected to the terminal body 121 and protrude from the terminal body 121. The pair of first crimping wings 124 are oppositely disposed. The second crimping wings 125 are connected to the terminal body 121 and protrude from the terminal body 121. The pair of second crimping wings 125 are oppositely disposed.

Figure 4:
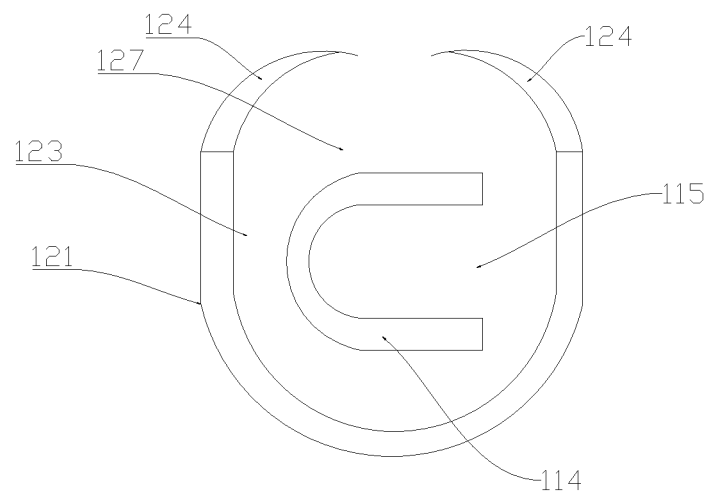
FIG. 4 is a schematic view showing a state before a crimping connection between the adaptor terminal and the crimping portion according to the present application.
Figure 5:
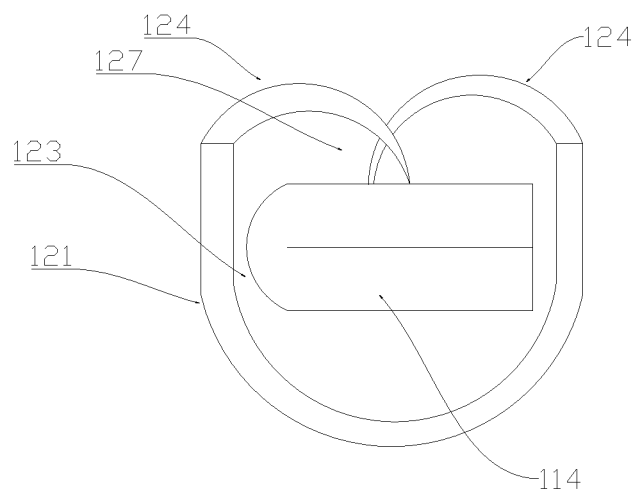
FIG. 5 is a schematic view showing a state after a crimping connection between the adaptor terminal and the crimping portion according to the present application.

The adaptor terminal 120 is in crimping connection with the connecting end 112 and the insulation sheath 118. Specifically, as shown in FIG. 4, the crimping portion 114 is positioned in the accommodating groove 123, and the first opening 115 and the second opening 127 are non-coincidently oriented, preferably to be perpendicular to each other. For example, the second opening 127 is arranged to be oriented upward, while the first opening 115 is arranged to be oriented leftward or rightward. The crimping portion 114 is located between the pair of first crimping wings 124. As shown in FIG. 5, the pair of first crimping wings 124 are pressed and deformed towards the crimping portion 114 to surround the crimping portion 114 in both directions or abut against the surface of the crimping portion 124 with their ends. The pair of first crimping wings 124 are pressed and deformed to form a crimping region. In this crimping region, the crimping portion 114 with a U-shaped cross section is folded after being pressed to form a two-layer structure. In the illustrated example, the crimping direction is in the up-down direction, and the crimping portion 114 is multi-layered in the up-down direction, in the figures being shown as a structure of two layers in contact with each other. The pair of first crimping wings 124 connect the crimping portion 114 to the terminal body 121. In the preferred example illustrated, after the pair of first crimping wings 124 are pressed and deformed, their ends abut against the surface of the crimping portion 114 to make it slightly deformed so as to enhance the abutting force.

Part of the insulation sheath 118 is located between the pair of second crimping wings 125, and the pair of second crimping wings 125 are pressed and deformed towards the insulation sheath 118 so as to surround the insulation sheath 118 in both directions. The pair of second crimping wings 125 connect the insulation sheath 118 to the terminal body 121. In the preferred example illustrated, the pair of second crimping wings 125 are pressed and deformed to surround the insulation sheath 118.

One or more flexible flat cable assembly 100, a support and a busbar constitute a battery pack connecting assembly used in batteries of new energy vehicles. The insulation sheaths 118 of the plurality of flexible flat cable assemblies 100 are arranged side-by-side and bonded to each other. The busbar is disposed on the support and electrically connected to the battery cell. The conductor body 118 of the flexible flat cable assembly 100 is electrically connected to the busbar.

To increase the utilization efficiency, the conductor in the flexible flat cable should be thin and narrow as much as possible. However, when the connecting end and the conductor body are configured to be integratedly formed, the thin and narrow connecting end cannot provide sufficient retention necessary for connection strength, and can be broken by crimping operation in the crimping process, or can fall off due to failure in providing stronger retention during use.

According to the flexible flat cable assembly and the battery pack connecting assembly of the present application, the crimping portion is configured to be folded in half to enable the crimping portion in crimping connection with the adaptor terminal to have an increased thickness, so that damages occurring in the crimping process can be avoided and also sufficient retention can be provided after crimping to ensure a secure connection during use, and safe and convenient operation. The flexible flat cable assembly of the application can be used instead of rigid circuit boards and flexible circuit boards, so that both the thickness of the battery pack and the production cost can be reduced, and the development of batteries can be further promoted to meet the use requirements of new energy vehicles.

The above are merely preferred embodiments of the present application, and are not intended to limit the protection scope of the application, and any amendments, equivalent substitutions or improvements within the spirit of the application shall fall within the scope of the claims of the application.

What is claimed is:

1. A flexible flat cable assembly, comprising:
a flexible flat cable comprising an insulation sheath, a conductor body wrapped by the insulation sheath, and a connecting end which is provided to be integrated with the conductor body and comprises a connecting portion and a folded crimping portion extending continuously from the conductor body; and an adaptor terminal comprising a terminal body and a pair of first crimping wings which are disposed on the terminal body and protrude from the terminal body; wherein the folded crimping portion is in contact with the terminal body, and the first crimping wings surround or abut against the folded crimping portion to form a crimping region in which the crimping portion has a multilayer structure.

2. The flexible flat cable assembly according to claim 1, wherein the crimping portion is plate-shaped and is configured to be folded in half in a length direction of the conductor body.

3. The flexible flat cable assembly according to claim 1, wherein the crimping portion is formed by pressing a structure with a U-shaped or V-shaped cross section.

4. The flexible flat cable assembly according to claim 2, wherein the crimping portion is provided with a first opening, the terminal body is enclosed to be groove-shaped, the groove-shaped terminal body is provided with a second opening, and the first opening and the second opening are non-coincidently oriented.

5. The flexible flat cable assembly according to claim 4, wherein the first opening and the second opening are oriented to be perpendicular to each other.

6. The flexible flat cable assembly according to claim 1, wherein the adaptor terminal is further provided with a pair of second crimping wings, and the pair of second crimping wings are disposed on the terminal body and protrude from the terminal body, and surround the insulation sheath to connect the terminal body to the connecting portion.

7. The flexible flat cable assembly according to claim 1, wherein the terminal body is enclosed to form an accommodating groove, and the pair of first crimping wings and a pair of second crimping wings are separately disposed on the terminal body; the connecting portion and the crimping portion are positioned in the accommodating groove, and via crimping, the first crimping wings are enabled to surround the crimping portion and the second crimping wings are enabled to surround the insulation sheath by crimping; and the first crimping wings and the second crimping wings connect the adaptor terminal to the connecting end and the insulation sheath.

8. The flexible flat cable assembly according to claim 7, wherein a plurality of the flexible flat cables are arranged to be connected side-by-side; the connecting end of each of the flexible flat cables is connected with one of the adaptor terminal; the accommodating groove of each of the adaptor terminal is provided with an opening; and an arrangement direction of the plurality of flexible flat cables is disposed to be non-coincident with an opening direction of the accommodating groove.

9. The flexible flat cable assembly according to claim 8, wherein the arrangement direction of the plurality of flexible flat cables is disposed to be perpendicular to the opening direction of the accommodating groove.

10. The flexible flat cable assembly according to claim 1, wherein the adaptor terminal is a male terminal or a female terminal.

11. The flexible flat cable assembly according to claim 1, wherein a plurality of the flexible flat cables are disposed to be connected side-by-side; and the connecting end of each of the flexible flat cables is connected with one of the adaptor terminals.

12. The flexible flat cable assembly according to claim 11, wherein a gap between the crimping portions of the plurality of connecting ends is larger than a gap between the plurality of conductor bodies.

13. The flexible flat cable assembly according to claim 1, wherein the crimping portion has a thickness larger than that of the conductor body.

14. The flexible flat cable assembly according to claim 1, wherein the individual layers of the crimping portion are disposed to be in contact with each other.

15. The flexible flat cable assembly according to claim 1, wherein the crimping portion has a multilayer structure in a crimping direction.

16. A battery pack connecting assembly, comprising:
a support,
a plurality of busbars, and
a plurality of the flexible flat cable assemblies according to claim 1, wherein the plurality of busbars are configured for connecting battery cells; and a plurality of the flexible flat cables are electrically connected to the plurality of busbars.

17. The battery pack connecting assembly according to claim 16, wherein a plurality of the flexible flat cables are provided; and the conductor bodies of the plurality of flexible flat cables are electrically connected to the plurality of busbars, respectively.

18. The battery pack connecting assembly according to claim 17, further comprising a connector casing, wherein the connector casing is fixedly disposed on the support; and the adaptor terminal is inserted into the connector casing for outputting electric signals.

\* \* \* \* \*